United States Patent Office 3,684,465
Patented Aug. 15, 1972

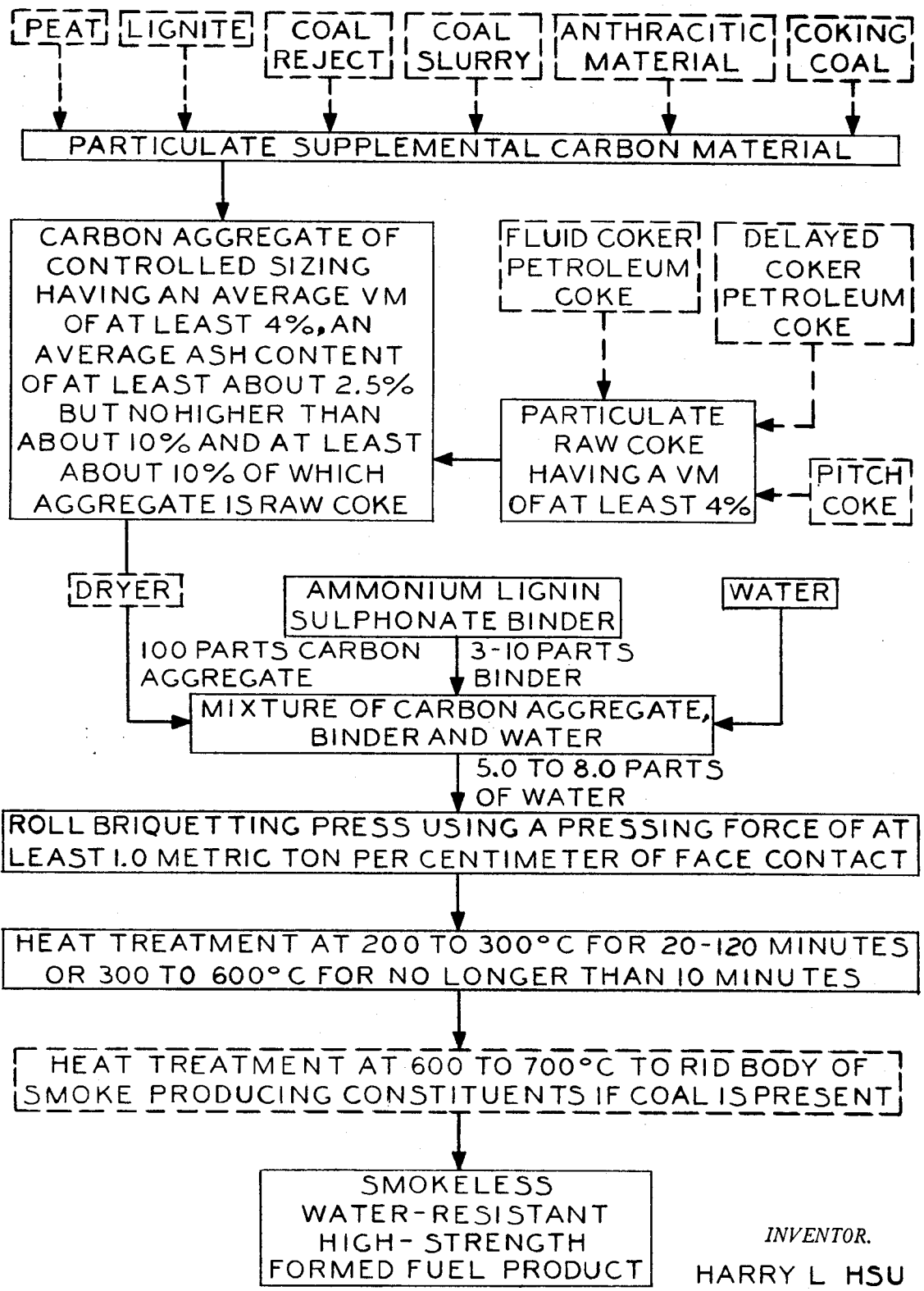
FIGURE I

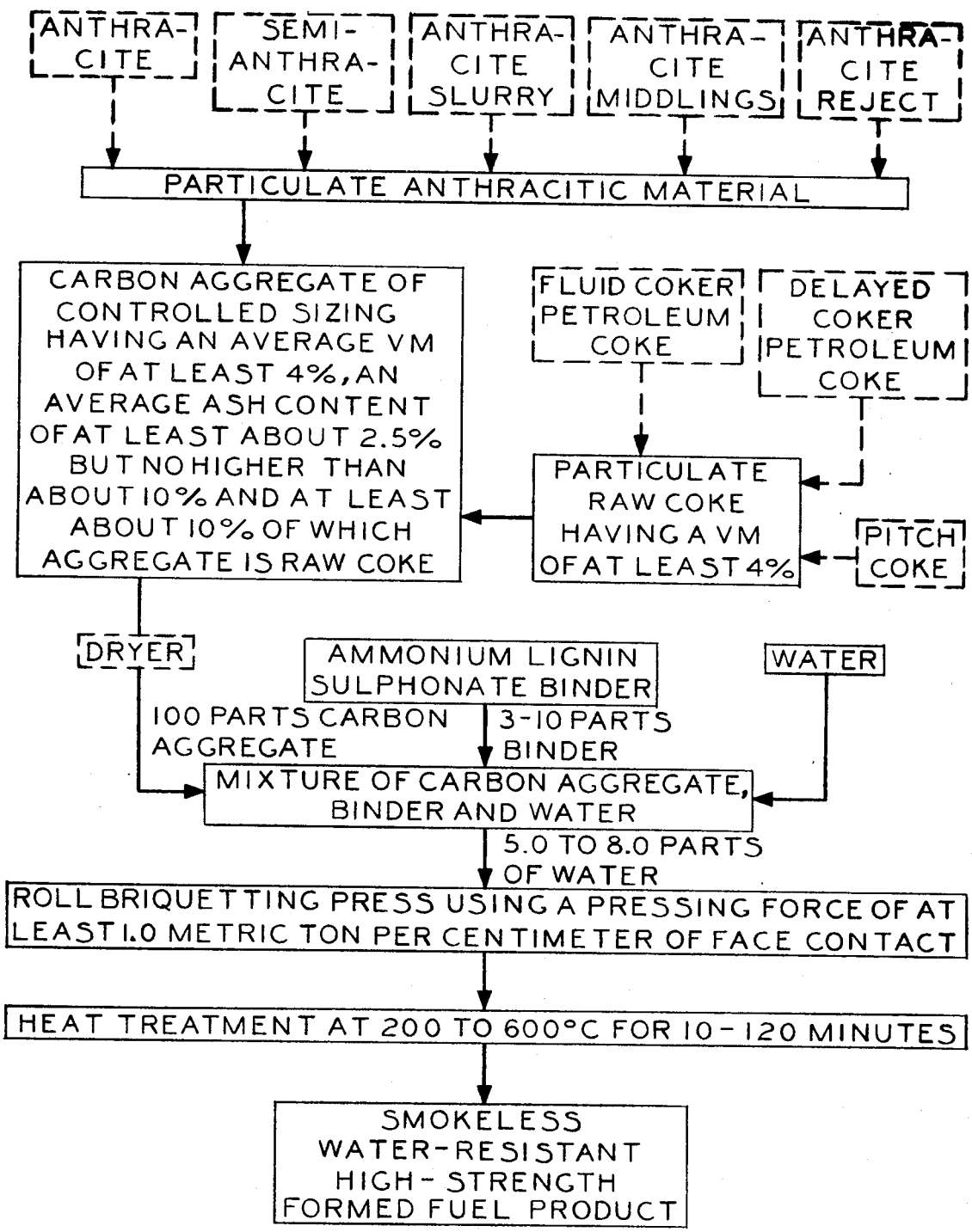
FIGURE II

3,684,465
FUEL BRIQUETS AND THEIR METHOD OF MANUFACTURE
Harry L. Hsu, Johnson City, Tenn., assignor to Great Lakes Carbon Corp., New York, N.Y.
Filed July 27, 1970, Ser. No. 58,607
Int. Cl. C10l 5/00
U.S. Cl. 44—10    10 Claims

ABSTRACT OF THE DISCLOSURE

Fuel briquets with good burning properties, complete water resistance and excellent strength are produced. The method of producing them consists in mixing carbon aggregate composed of particulate raw coke (such as delayed coker, raw petroleum coke) and supplemental particulate carbon material (which preferably is or includes an anthracitic material), with 3–10% ammonium lignin sulfonate and water followed by briquetting and heat treatment at a temperature between 200° C. and 600° C. typically for a period of time between 10 and 120 minutes. The amount of supplemental carbon material, e.g. anthracitic and/or other material, used in the carbon or coke mixture depends upon a number of factors, especially its ash and volatile matter content as well as product specifications. In any case, it will not amount to more than 90% of the carbon aggregate employed and more typically will be 75% or less. Briquets possessing high strength in both their "green" and final heat-treated states can be produced even while employing a rapid forming operation, i.e. roll briquetting.

BACKGROUND OF THE INVENTION

(1) Field of the invention

The present invention relates to the field of combustible formed fuel, especially fuel briquets suitable for domestic heating purposes. The briquets produced herein possess good burning properties, excellent strength and complete water resistance. They possess good heating values in terms of B.t.u.'s per pound, are readily ignited and burn evenly and relatively slowly. Upon burning, they also undergo a low degree of decrepitation, leave a controlled amount of ash which is below the acceptable limits, and evolve low quantities of smoke or tarry material. In many respects the formed fuel(s) and/or the process(es) of the present invention are also superior to, or advantageous over, formed fuels prepared from other types of carbonaceous aggregate materials, and/or by using different binders, and/or by using different processing techniques, because of differences in one or more of the foregoing described product requisites or properties, and/or because of benefical differences in the processing conditions employed in preparing the respective formed fuels.

(2) Description of the prior art

The prior art, considering both commercial practices and literature references relating to formed fuel, is extensive. Such elements as the particular aggregate being bonded, the particular binder system employed, processing techniques used in preparing the aggregate for forming, and/or in forming the fuel, and subsequent treatment steps which are necessary and/or which are carried out upon the formed fuel after the forming operation, are key factors for consideration in determining the pertinency of the prior art or lack of same. Also a key factor in the evaluation of pertinency is an appraisal of the goals sought to be achieved in the present invention and the similarity (or dissimilarity) of same with goals sought in prior art practices and references.

SUMMARY OF THE INVENTION

An object of the present invention is to produce a formed fuel in briquet form which is very suitable for domestic heating purposes because of its possessing the following properties:

(a) Good burning properties, or combustion characteristics, including high B.t.u. per pound values, readily ignitable, low degree of decrepitation, uniform and prolonged burning at high heat output, quick recovery of high heat output after banking for prolonged periods, controlled amount of ash residue and liberation of low quantities of smoke or tarry material upon burning;

(b) Excellent strength; and (c) Capability of withstanding adverse and open weather conditions in storage and shipment by virtue of being waterproof.

Another object of the present invention is to produce a competitive formed fuel as inexpensively as possible by employing economical raw materials (such as ash anthracite and/or other carbonaceous materials high in ash) and a process which entails a minimum of expense.

Another object of the present invention is to provide a commercially attractive outlet for conventional delayed coker and fluid coker raw petroleum cokes, and raw coal tar pitch coke, particularly the fractions of said cokes which are of a relatively fine particle size.

Another object of the present invention is to produce a formed fuel having competitive properties by means of a high-volume, rapid and efficient process.

DESCRIPTION OF THE DRAWING

The invention will be better understood by reference to the block drawings presented herewith.

The basic process comprises preparing a mixture comprised of 100 parts by weight of carbon aggregate which comprises at least about 10% of particulate raw coke and the remainder is particulate supplemental carbon material which preferably is or includes an anthracitic material, about 3 to 10 parts of ammonium lignin sulfonate binder per 100 parts of carbon aggregate, and about 5.0 to about 8.0 parts by weight of water per 100 parts of carbon aggregate, forming this mixture into the desired shape in a roll briquetting operation employing a pressing force of at least 1.0 metric ton per centimeter of face contact; and then heat-treating the formed mixture at a temperature between about 200° C. and about 600° C., typically for a period of time between about 10 and about 120 minutes, to yield a substantially smokeless, water resistant, high strength formed fuel product. Suitable materials which can be employed as the "supplemental carbon material" are shown at the top of FIG. I while suitable "anthracitic materials" are shown at the top of FIG. II.

The parts of carbon aggregate and binder set forth are on a dry solids basis and the parts of water indicated are inclusive of any moisture or water derived from one or more of the ingredients making up the mixture as well as, of course, separate water which is added in preparing the mixture The particle sizing, volatile matter (VM) content and ash content of the carbon aggregate are all important, for reasons discussed hereinafter.

The forming step is carried out by means of a roll briquetting operation using a briquetting machine with continuously advancing opposing rolls with faces having rows of concave depressions or pockets which define the desired shape and volume of the briquets to be produced. The roll faces may possess any given or desired number of opposing rows of pockets which shape the briquets, such as 4 rows or 8 rows etc., depending upon the design of the machine and/or the desired production capacity. In any case, a pressing force of at least 1.0 metric ton, preferably between about 1.5 and 2.5 metric tons, and generally no higher than 4 metric tons, per centimeter of roll face, is employed in the forming step.

A particulate, supplemental carbon material (which preferably is or includes an anthracitic material), is employed along with the raw coke, in amounts totaling no more than about 90% of the entire carbon aggregate material employed, but more typically in amounts lower than this, such as no higher than about 75%. Amounts of some anthracitic materials which are substantially lower than 75%, such as only up to about 30% of the carbon aggregate, are sometimes also preferred. Reasons for these ranges are discussed hereinafter.

Upon being formed, the fuel possesses a very good "green" strength, amply suitable for handling and transfer operations which precede the heat-treatment step. The formed fuel may be dried (such as by heating to about 100° C.) before the heat-treatment step or during the heat-treatment step. Green strength refers to the strength of the formed fuel immediately after forming (wet green strength) or immediately after drying (dry green strength) but before completion of the post-forming heat-treatment step. After forming, the formed body, possessing wet or dry green strength, is rendered permanently strong and water resistant by a heat-treating step wherein the formed body is heated at a temperature between about 200° C. and about 600° C. typically for a period of time between about 10 minutes and about 120 minutes, the shorter heating times being employed with the higher heating temperatures and vice versa. For optimum results and process economics, heating times between 20 and 60 minutes and heat-treating temperatures not exceeding about 300° C. are generally employed. Temperatures other than the foregoing i.e. up to 700° C. may beneficially be employed if for example, coking coal is used as a part of the carbon aggregate, in order to rid the formed body of a substantial amount of the smoke producing constituents of the coking coal component. In such case, the heat treatment may be in one stage up to 700° C. or may optionally be in two or more stages, first between 200 to 300° C. and then between 300 to 700° C., using an inert or reduced oxygen content atmosphere above 400° C. to avoid burning the fuel bodies.

DESCRIPTION OF THE PREFERRED EMBODIMENTS

The raw petroleum cokes employed in making the formed fuel bodies of the present invention result from the thermal cracking and polymerization, in either a fluid coker or a delayed coker, of heavy petroleum residues such as reduced or topped crudes, thermally or catalytically cracked residuums, etc. "Fluid coker" raw petroleum coke will typically have a volatile matter (VM) content exceeding 4% and "delayed coker" raw petroleum coke a VM content exceeding 8%. In making delayed coker raw petroleum coke, which is preferred for use in the present invention, the coking is normally conducted in a vertical cylindrical drum such as those manufactured by Kellogg, Lummus and Foster Wheeler Companies. Typically, the heavy hydrocarbons are admitted into the drum at a temperature between about 875° and about 950° F. and are permitted to heat soak, crack and polymerize until the drum is nearly filled with solid coke. This material is removed from the drum by various decoking methods known to the art. Raw coal tar pitch coke may also be used. Only raw cokes having a volatile matter (VM) content exceeding about 4% by weight are employed in the present invention. Preferably delayed coker raw petroleum coke will be used and preferably also its VM will be between about 8% and about 20%.

The volatile matter (VM) being discussed here is determined by ASTM method D 271–48 modified for "sparking fuels" and is exclusive of the moisture and free oil which would be removed by heating to temperatures of 400°–500° F.

In the case of "delayed coker" coke, the raw petroleum coke removed from the coking drum is typically transferred to an open storage pile and exposed to prevailing weather conditions for varying periods of time before it is further used elsewhere, such as, as a carbon aggregate material as in the present invention. (Coke from such storage piles is referred to as "run-of-pile"). Water is usually used in decoking the coke from the drum. The petroleum coke may also come in contact with water because of its encountering rainy weather conditions while in storage. Because of the foregoing, the moisture content of the raw petroleum coke is a variable. Typically, it might contain about 12% moisture although this figure is highly variable.

The volatile matter (VM) content of the raw petroleum coke is also a variable and depends upon such factors as the position in the drum from which the coke was taken (there is a slight variance from top to bottom) and also the temperature and time employed in permitting the heavy hydrocarbons to remain within the drum. Under normal coking conditions, the VM content of the coke removed from the drum will usually range between about 8% and about 20%, with 11 to 13% being a typical value.

The size of the coke material removed from the drum is also a variable and depends partly on the particular technique used to remove the coke from the drum and the severity of degradation of the coke caused by the particular removal method employed. Typically the raw coke removed from the drum and available from a storage pile ("run-of-pile" coke) might possess a sizing such that 100% of it will be smaller than 12 inches (dimension in any direction), about 80% will be smaller than 4 inches, about 60% will be smaller than ¾ inch, about 40% will be smaller than ¼ inch and about 30% will be smaller than ⅛ inch. For many end uses the coarser particles (e.g. above ¼") obtained from the "run-of-pile" coke are the desired material, and the "fines" are undesired or considered discard material. The present invention can make use of most or all of the finer particles. It can also make use of the coarser materials, if desired, by means of preliminary crushing and/or milling steps. Typically, however, an initial screening step to separate the minus ¼ inch coke will be carried out. The particles larger than ¼ inch will be separated and designated for a different use than in the present invention. The minus ¼ inch material will then be milled to obtain the required sizing specified hereinafter. Typically this required sizing can be obtained using suitable mill settings, either by milling all of the minus ¼ inch material or by milling only one-half of the minus ¼ inch material and then blending the milled material 50:50 with the remaining unmilled minus ¼ inch material. Similar procedures for obtaining proper particle sizing can also be applied to raw pitch coke or to "fluid coker" raw petroleum coke if either of these is used instead of "delayed coker" raw petroleum coke, as well as to the supplemental carbon material, such as anthracite, that is used along with the raw coke in the present invention.

The supplemental particulate carbon material used with the raw coke in the present invention may be chosen from a number of materials including "anthracitic materials," coking coals, including low, medium and high volatile coking coals, dewatered coal slurry, coal reject (or refuse), peat and lignite and mixtures of these materials. "Anthracitic materials" are preferred and these include anthracite, semi-anthracite, dewatered anthracite slurry, anthracite middlings and anthracite reject (or refuse). The volatile matter content and ash content of these supplemental carbon materials vary considerably.

As a general guide to most of the VM and ash contents of the foregoing materials, the following table is set forth:

TABLE I

| Material | Volatile matter (VM) Percent | | Ash Percent | |
|---|---|---|---|---|
| | Range | Typical | Range | Typical |
| Delayed coker raw petroleum coke | 8-20 | 11-13 | <1.0 | 0.3 |
| Fluid coker raw petroleum coke | 4-8 | 5 | <1.0 | 0.6 |
| Pitch coke | 8-20 | 12 | <1.0 | 0.8 |
| Anthracite | 2-8 | 6 | 9-13 | 10 |
| Semi-anthracite (anthracite duff) | 8-14 | 12 | 6-12 | 7 |
| Anthracite slurry [1] | 4-12 | 10 | 20-40 | 25 |
| Anthracite middlings | 4-12 | 10 | 15-30 | 25 |
| Anthracite reject [1] | 4-12 | 10 | <40 | 75 |
| Peat | 55-80 | 65 | 2-5 | 3 |
| Lignite | 45-60 | 47 | 3-9 | 6 |
| Coal reject [1] | 14-40 | [2] | >40 | 80 |
| Coal slurry [1] | 14-40 | [2] | 20-40 | 30 |
| Low volatile coking coal | 14-22 | 17 | 2-8 | 6 |
| Medium volatile coking coal | 22-32 | 23 | 2-12 | 9 |
| High volatile coking coal | >32 | 36 | 3-12 | |

[1] Anthracite slurry and anthracite reject (or refuse) are the by-products from the coal preparation or beneficiation (e.g. froth flotation)) of the anthracite from the mine; they are abundant and cheap because of their high ash content, considered excessive for many purposes. Within the limits defined herein, however, they are very suitable for use in the present invention. Similar comments apply to coal slurry and coal reject (or refuse).
[2] Depends on type of coal.

All of these must be dewatered and dried before or after blending with the coke ingredient.

The carbon aggregate employed to prepare the formed, smokeless, water-resistant, high-strength fuel of the present invention is made from a mixture of raw coke (delayed coker petroleum coke and/or fluid coker petroleum coke and/or pitch coke), and one or more of the supplemental carbon materials set forth in the above table. The quantities of particulate materials employed in the mixture are chosen in such a manner as to insure that the final fuel product has the desired burning properties, high strength, and low decrepitation. To insure this, it is necessary that at least 10% of the carbon aggregate be raw coke, that the VM of the carbon aggregate exceed about 4% but be less than about 20%, and that the ash content of the carbon aggregate exceed about 2.5% but be less than about 10%.

It will be noted from the foregoing table of carbon materials that the ash contents of the raw cokes employed in the present invention are less than 1%. This, of course, means that a relatively substantial amount of a low ash supplemental carbon material and/or a relatively small amount of a high ash supplemental material has to be employed along with the raw coke in order that the ash content of the carbon aggregate exceed 2.5% and also so that the average ash content of the carbon aggregate will not exceed 10%, and will preferably be less, e.g. 6%. A minimum ash content of 2.5% is necessary in order to obtain desired product properties such as high strength and low decrepitation while a maximum ash content not exceeding 10% is necessary in order to maintain B.t.u. content and assure desired burning properties.

The VM and ash contents of typical carbon aggregate mixtures which may be employed in the present invention are readily determinable from the VM and ash contents of the individual ingredients making up the mixture and the proportions of the individual ingredients employed. The following table of compositions which may be employed in the present invention further illustrates these aspects of the present invention:

TABLE II

| Composititon | Raw coke employed | | | | Supplemental carbon material employed | | | | Final mixture | |
|---|---|---|---|---|---|---|---|---|---|---|
| | Type [1] | Parts | VM | Ash | Type [2] | Parts | VM | Ash | VM | Ash |
| a | DC | 80 | 13 | 0.3 | AS | 20 | 10 | 25 | 12.4 | 5.24 |
| b | DC | 25 | 10 | 0.3 | AD | 75 | 12 | 7 | 11.5 | 5.32 |
| c | DC | 25 | 10 | 0.3 | AD / Coking coal | 65 / 10 | 12 / 20 | 7 / 6 | 12.3 | 5.22 |
| d | FC | 80 | 5 | 0.6 | AS | 20 | 10 | 25 | 6.0 | 5.48 |
| e | FC | 20 | 5.5 | 0.6 | AD | 80 | 12 | 7 | 10.7 | 5.72 |
| f | FC | 80 | 5 | 0.6 | AS / Coking coal | 10 / 10 | 10 / 20 | 25 / 6 | 7.0 | 3.58 |

[1] DC—Delayed Coker; FC—Fluid Coker.
[2] AS—Anthracite Slurry; AD—Anthracite Duff.

It will be noted in compositions c and f, the supplemental carbon material includes a coking coal along with an anthracitic material. The coking coal helps insure that the formed fuel product will have the desired lower decrepitation upon burning. When the supplemental carbon material includes such a coking coal, it will preferably be milled to a particle size such that substantially all of it is finer than 2 millimeters, so as to enable it to be dispersed throughout the mixture, so that during burning of the formed briquet the coking coal will contribute to the low decrepitation of the formed product. Otherwise, and as with compositions a, b, d, and e, low decrepitation results are obtained by the interaction of the ammonium lignin sulfonate with the carbon aggregate and close control of other processing variables as discussed herein.

It is necessary that the carbon aggregate employed in the present invention possess a particle size that no more than about 20% of same would be retained on a 3 millimeter screen, at least about 30% and no more than about 55% would be retained on a 0.5 millimeter screen, and at least about 50% and no more than about 75% would be retained on a 0.2 millimeter screen in order to provide the desired interaction between the raw coke and supplemental carbon (e.g. anthracite) ingredients and proper and adequate dispersal of the ammonium lignin sulfonate binder within and about the carbon aggregate during the mixing step. Such sizing is also necessary for the roll briquetting forming operation because of the very brief (almost instantaneous) time that is available and employed in pressing the materials of the mixture into intimate contact with each other.

Proper particle sizing of the carbon aggregate to be transformed into a formed fuel is also important because the green strength of the briquets leaving the briquetting apparatus depends not only upon the bonding action exerted by the ammonium lignin sulfonate, but also upon the interlocking action which takes place between the carbon particles as well as upon capillary-like bonding forces or hydrophilic attraction between the carbon particles. The quantum of desired "interlocking" action is primarily a result of the particle size distribution of the carbon aggregate materials whereas the amount of desired "capillary-like" bonding forces set up between the particles is primarily affected by or related to the amount of water employed in the mixture and the density of the carbon aggregate. This density, in turn, defines the total pore volume available and is also related to the size and shape of the pores of the carbon materials into which are forced the ammonium lignin sulfonate binder and water under high pressure. This establishes the capillary-like bonding forces which assist in providing the desired green strength necessary in order that the formed fuel survive, intact, the forming step and the subsequent heat-treatment step, and handling during said steps before reaching the final product.

Many of the foregoing aspects of the present invention are also related to the amount of pressing force employed in the briquetting operation in helping to establish effective interlocking of the carbon particles and also in effectively establishing the desired capillary-like bonding forces between the particles. In order to carry out the process by means of a continuous briquetting operation, and at the same time attain a product having satisfactory green strength, it is necessary that a pressing force of at least 1.0 metric ton per centimeter of roll face contact be exerted upon the mixture of the carbon aggregate, ammonium lignin sulfonate binder and water as the mixture is formed into briquets. More preferably the pressing force employed in this step will be between about 1.5 and about 2.5 and generally no higher than 4 metric tons per centimeter of roll face contact. The particular amount of pressing force within these ranges which will be employed during any given production run will depend primarily upon the density, relative hardness and proportions of the particles being formed, the particle sizing used, and the amount of water used, these variables generally being so balanced as to obtain as high a green and final heat treated strength as possible. Conditions will also be adjusted depending upon the amount, type and sizing of the supplemental carbon material (or materials) employed along with the raw coke. Pressing forces less than 1.0 metric ton per centimeter of roll face contact are unsatisfactory because the green briquets produced are too weak for handling due to lack of the bonding action between carbon and binder particles and the lack of interlocking action between carbon particles. Also, an undesirably large proportion of the feed is not even formed. Pressing forces higher than about 4 metric tons per centimeter of roll face contact produce briquets split in half or with a clamshell-like gap at the joint of the half briquets, resulting in a lower final compressive strength and in a poorer yield of briquets.

The specific amounts of water and ammonium lignin sulfonate binder used in any given instance vary somewhat depending upon the nature of the particular carbon aggregate composition being formed, but for desired results it has been found that in all cases the total amount of water employed in any given mixture should be between about 5.0 and about 8.0 parts by weight per 100 parts of the carbon aggregate, and the amount of binder employed should be between about 3 and about 10 parts by weight per 100 parts of the carbon aggregate employed. As previously indicated, the parts of water used is inclusive of the original amount (if any) of water or moisture contained in the carbon aggregate materials and the binder, plus any extraneous water added prior to forming. To assure close control of water content it is necessary to preliminarily dry (or partially dry) the carbon aggregate (or one or more of the materials making up said aggregate) to a given moisture level before mixing the carbon aggregate with binder and water. If liquid solution of binder is used, the water content may satisfy all or a portion of the 5 to 8% water requirement of the briquetting mixture. The possible use of a dryer in the process is shown in the drawings by dotted-line blocks. Water amounts less than about 5.0 parts per 100 parts of the carbon aggregate require excessive briquetting pressing forces and also result in weak briquets of high decrepitation while water amounts greater than about 8.0 parts per 100 parts of the carbon aggregate result in "claim-shelling" after forming, sticking in the roller pockets, and poor final strength on heat treating. Amounts of ammonium lignin sulfonate binder less than about 3 parts per 100 parts of carbon aggregate result in poorly bonded briquets of weak green and heat-treated strength while amounts of binder greater than about 10 parts per 100 parts of carbon aggregate result in excessively thick layers of bonding material from the ammonium lignin sulfonate after heat treatment. These thick layers are highly reactive compared to the carbon aggregate and contribute to decrepitation. Very satisfactory results are generally obtained using from about 4 to about 6 parts of binder per 100 parts of carbon aggregate and for this reason, and because of economic and other considerations, as just discussed, binder quantities of no more than 7 parts per 100 parts of carbon aggregate will almost invariably be used.

It is necessary that the carbon aggregate materials employed have an average VM content above about 4% but lower than about 20% and more preferably between 8% and about 15%. A minimum VM content of about 4% for the carbon aggregate employed in the present invention is important for several reasons. One of these is because of the role the VM content plays in subsequent performance of the formed fuel in any of its intended uses after it has been heat-treated. The VM content helps (along with other features of the invention, such as the interaction generated between the raw coke and the supplemental carbon material) to maintain the integrity of the formed bodies when they are in use and to prevent degradation or disentegration during burning. In other words, the VM content of the carbon aggregate provides some autogenous bonding between the particles as the temperature of the formed fuel is raised to its use (or burning) temperature. A VM content exceeding about 20% is undesirable because the final fuel product would then liberate excessive smoke upon combustion.

The following examples further demonstrate the teachings of the present invention:

Example I.—Pillow-shaped briquets having a volume of 30 cc. were made in a roll-briquetting operation from a measured quantity of mixture of 100 parts of delayed coker raw petroleum coke, 5 parts of ammonium lignin sulfonate binder, and 6 parts of water; the parts of binder and water were each by weight, per 100 parts of the petroleum coke. The pressing force employed in the forming step was 2 metric tons per centimeter of face contact. After forming, the briquets were heat treated at a temperature of 250° C. for 50 minutes, and then cooled to room temperature. After forming, measurements were made as to briquet yield and briquet green strength and, after heating, for final compressive strength and decrepitation value. The results are set forth hereinafter.

final compressive strength and briquet decrepitation value and the results are also set forth hereinafter.

The following table sets forth some significant results of the foregoing examples:

TABLE III

| Example | Briquet yield, wt. percent | Average briquet wet green strength (for 10 briquets)[1] | Average briquet compressive strength (for 50 briquets)[2] kg. | Average decrepitation (for 55 briquets) | Average, ash content | Average VM content | General comments re burning properties |
|---|---|---|---|---|---|---|---|
| I | 90 | 1 | 80 | 29.2 | 0.6 | 13.4 | Ignited readily with some coke sparks; low resistance to decrepitation. |
| IIa | 92 | 2 | 74 | 27.7 | 7.1 | 13.8 | Ignited readily with noticeable decrepitation. |
| IIb | 98 | 4 | 155 | 6.8 | 32.0 | 12.5 | Very difficult to ignite; ash content too high for domestic fuel purposes and insufficient BTU content. |
| IIc | 90 | 2 | 103 | 22.3 | 5.5 | 13.7 | Ignited readily and burned with clean flame. |
| IId | 91 | 2 | 87 | 20.5 | 3.8 | 13.5 | Ignited readily with uniform burning and attractive flame. |
| IIe | 95 | 3 | 92 | 6.1 | 6.9 | 13.3 | Ignited readily; uniform and prolonged burning; attractive, clean flame; very low decrepitation. |
| IIf | 95 | 3 | 88 | 7.5 | 6.0 | 13.0 | Do. |

[1] No. of 3 ft. drops on concrete without breaking.
[2] The strength of heat-treated briquets is determined by Acme penetrometer with a 1¼″ punch.

The raw petroleum coke employed in this example and in Example II possessed the following properties:

| Screen size (mm.) | Cumulative weight, percent |
|---|---|
| +3 | 6.32 |
| +2 | 13.78 |
| +1 | 27.48 |
| +0.5 | 43.18 |
| +0.2 | 68.18 |
| +0.1 | 91.68 |
| −0.1 | 8.32 |

NOTE.—VM 11.5%; Ash 0.6%.

The ammonium lignin sulfonate binder employed in the present invention is typically a free-flowing spray-dried powder of about 92% dry substance made from the digestion of wood with ammonium bisulphite. The powders are essentially ammonium lignin sulfonate—plus wood sugars, which are present in fixed proportions to the ammonium lignin sulfonate. The binder is also available in water solution containing, for example 50%–55% solids. The wood sugars typically contain the Hexoses: mannose, galactose, glucose; and the Pentoses: xylose and arabinose. The binder is sold under the trademark Orzan by the Crown Zellerbach Company in the United States and under the trademark Totanin by the A/S Toten Cellulose Fabrik Company in Norway.

Example II.—Briquets were made in a manner identical to Example I, using the same amount of binder and water, and the same pressing force and heat-treating conditions, but with variation in the carbon aggregate material being bonded. In place of the 100 parts of petroleum coke of Example I, the following carbon aggregates were bonded:

(a) 100 parts of semi-anthracite having a VM content of 12%, an ash content of 7%, and a particle sizing of 8.5% +3 millimeters, 41.3% +0.5 millimeter, and 62.1% +0.2 millimeter;

(b) 100 parts of anthracite slurry having a VM content of 10.6%, an ash content of 31.9%, and a particle sizing of 2.5% +3 millimeters, 35.4% +0.5 millimeter, and 55.8% +0.2 millimeter;

(c) 75 parts of semi-anthracite of Example II(a) and 25 parts of the petroleum coke of Example I;

(d) 50 parts of semi-anthracite of Example II(a) and 50 parts of the petroleum coke of Example I;

(e) 80 parts of the petroleum coke of Example I and 20 parts of anthracite slurry of Example II(b); and (f) 80 parts of the petroleum coke of Example I and 20 parts of anthracite slurry having a VM content of 9.8%, an ash content of 27.6%, and a particle sizing of 0.5% +3 millimeters, 31.2% +0.5 millimeter, and 50.7% +0.2 millimeter.

The briquets made from the foregoing carbon aggregates were also tested after forming for briquet yield and briquet green strength; and after heat-treating for briquet The foregoing table demonstrates or helps to show why many of the previously discussed features or limitations of the present invention are necessary in order to achieve desired or optimum results. If calcium lignin sulfonate is substituted for ammonium lignin sulfonate as binder, briquets of suitable green strength are obtained but the final heat-treated briquets are not waterproof; also, after heat treatment they suffer a considerable reduction in strength as compared to briquets made using ammonium lignin sulfonate binder. However, it may be desirable to use calcium lignin sulfonate as a binder because of its availability or supply or some other reason. In that case, it should be reacted with a slight excess (over the stoichiometric amount) of a calcium ion-precipitating compound containing the ammonium cation to precipitate the calcium. Examples of suitable compounds for this purpose are ammonium sulfate and ammonium oxalate.

Briquets may also be made using pitch coke and fluid coker raw petroleum coke in the place of delayed coker raw petroleum coke; and also using a small amount of finely divided coking coal in a manner as previously discussed. Satisfactory results are achieved in each instance.

Examples II(c), (d), (e), and (f) were repeated by employing 4 and 10 parts of water respectively instead of the 6 parts of water specified in the preceding examples. In each instance, one or more of the properties of green strength, final compressive strength and/or decrepitation value deteriorated considerably, from values obtained using 6 parts of water, clearly indicating the importance of the amount of water employed in the process for the attainment of optimum properties. As previously indicated, this should be between about 5.0 and about 8.0 parts by weight per 100 parts of carbon aggregate.

Briquets simulating competitive commercial briquets, such as pitch bonded anthracite briquets, were also formulated and tested and their properties compared against the briquets of the present invention. It was noted that the briquets of the present invention typically possess significantly lower decrepitation values than the tested pitch bonded products, and also typically evolve significantly lower quantities of tarry material in the exhaust gases, per kilogram of briquets burned, as compared to the amounts of tarry materials evolved by the simulated competitive products. Other properties of the briquets of the present invention, such as heating value in terms of B.t.u.'s per pound of product and final compressive strength were also equivalent to or competitive with the corresponding properties of the simulated commercial products tested. The superior results obtained with the products of the present invention with respect to reduced decrepitation and reduced evolution of tarry material were not achieved at the expense of other property values important for a satisfactory or commercially competitive product.

Raw material and/or product specification values referred to in the foregoing were obtained by using techniques which are now described:

Ash.—The ash is determined by complete combustion in excess air of a weighed sample of the coal or carbonaceous substance. From the weight of noncombustible residue the percentage of ash is calculated.

"Self-agglutinating" or "agglomerating" or autogenously bonding" material.—A carbonaceous material which in the volatile-matter test gives a button showing swelling or cellular structure, or capable of supporting a 500 g. weight. A nonagglomerating coal or carbonaceous material forms a powder or crumbles under the load imposed by the weight.

Another way of determining the agglutinating quality of a coal or a carbonaceous substance consists in determining the degree of dilution with uniform grains of silica sand which the coal or other carbon material will stand, and still produce a caked residue when 20 g. of the mixture are carbonized at 950° C. (1742° F.)

Water resistance.—The briquet compressive strength remains substantially the same after one week's immersion with no deterioration in quality and the water remains clear and colorless.

Decrepitation.—The method for determining this property involves the burning of briquets in a special revolving grate, in the shape of a squirrel cage, at ¼ revolution per minute, under standardized conditions. The cage is charged with 2 kilograms of briquets and placed in a preheated furnace at 550° C. with a constant air flow. The temperature is recorded every 5 minutes for 45 minutes. The air flow is stopped and nitrogen introduced to cool the briquets. Decrepitation is expressed as the percentage of combustible matter lost to the ash pan with respect to the combustible matter consumed.

The foregoing describes and exemplifies my invention but I intend to be limited only by the scope of the appended claims.

I claim:

1. A process for the production of a formed, smokeless fuel which comprises the following steps:
    (a) preparing a mixture comprising 100 parts by weight of carbon aggregate, about 3 to about 10 parts by weight of ammonium lignin sulfonate binder per 100 parts of carbon aggregate, and about 5.0 to about 8.0 parts by weight of water per 100 parts of carbon aggregate, the parts of water being inclusive of any water or moisture derived from one or more of the ingredients making up said mixture;
    (b) forming the mixture into the desired shape in a roll briquetting operation, employing a pressing force of at least 1.0 metric ton per centimeter of face contact; and
    (c) heat treating the formed body at a temperature between about 200° C. and about 600° C.; said carbon aggregate having an average volatile matter content between about 4% and about 20%, and an average ash content between about 2.5% and about 10%, and consisting of a mixture of from about 10% to about 90% of particulate raw coke and correspondingly from about 90% to about 10% of supplemental particulate carbon material; said raw coke having a volatile matter content exceeding about 4%, and said supplemental particulate carbon material having such a VM content and such an ash content, and being employed in such an amount that the VM of the carbon aggregate exceeds about 4% but is less than about 20%, and the ash content exceeds about 2.5% but is less than about 10%, the carbon aggregate also having an average particle size distribution such that no more than about 20% of same would be retained on a 3 millimeter screen, at least about 30% and no more than about 55% would be retained on a 0.5 millimeter screen, and at least about 50% and no more than about 75% would be retained on a 0.2 millimeter screen.

2. A process according to claim 1 wherein the supplemental particulate carbon material is selected from the group consisting of an anthracitic material, low volatile coking coal, medium volatile coking coal, high volatile coking coal, coal slurry, coal reject, peat and lignite and mixtures thereof.

3. A process for the production of a formed smokeless fuel which comprises the following steps:
    (a) preparing a mixture comprising 100 parts by weight of carbon aggregate, about 5 to about 10 parts by weight of ammonium lignin sulfonate binder per 100 parts of carbon aggregate, and about 5.0 to about 8.0 parts by weight of water per 100 parts of carbon aggregate, the parts of water being inclusive of any water or moisture derived from one or more of the ingredients making up said mixture;
    (b) forming the mixture into the desired shape in a roll briquetting operation, employing a pressing force of at least 1.0 metric ton per centimeter of face contact; and
    (c) heat treating the formed body at a temperature between about 200° C. and about 600° C.; said carbon aggregate having an average volatile matter content between about 4% and about 20%, and an average ash content between about 2.5% and about 10%, and consisting of a mixture of from about 10% to about 90% of particulate raw coke and correspondingly from about 90% to about 10% of an anthracitic material; said raw coke having a volatile matter content exceeding about 4%, and said anthracitic material having such a volatile matter content and such an ash content, and being employed in such an amount that the VM of the carbon aggregate exceeds about 4% but is less than about 20%, and the ash content exceeds about 2.5% but is less than about 10%, the carbon aggregate also having an average particle size distribution such that no more than about 20% of same would be retained on a 3 millimeter screen, at least about 30% and no more than about 55% would be retained on a 0.5 millimeter screen, and at least about 50% and no more than about 75% would be retained on a 0.2 millimeter screen.

4. A process according to claim 3 wherein the anthracitic material is selected from the group consisting of anthracite, semi-anthracite, anthracite slurry, anthracite reject and anthracite middlings.

5. A process according to claim 1 wherein the raw coke is delayed coker raw petroleum coke and possesses a volatile matter content between about 8% and about 20%.

6. A process according to claim 1 wherein the raw coke is fluid coker raw petroleum coke and possesses a volatile matter content between about 4% and about 8%.

7. A process according to claim 3 wherein the coke employed is delayed coker, raw petroleum coke and wherein the anthracitic material employed with coke is anthracite slurry and is employed in an amount between about 10% and about 30% of the carbon aggregate.

8. A process according to claim 1 wherein no more than about 75% of the carbon aggregate is anthractic material.

9. A process according to claim 3 wherein the anthracitic material possesses an average volatile matter content exceeding about 8% and an average ash content exceeding about 6% and possesses some self-agglutinating power when heated to a temperature near its combustion temperature.

10. A process according to claim 1 wherein coking coal comprises at least about 10% of the supplemental carbon material and wherein the heat treated body is additionally heated to a temperature up to 700° C. to rid the body of a substantial amount of the smoke producing constituents of the coking coal component.

11. A process according to claim 10 wherein said coking coal possesses a particle size such that substantially all of it is finer than 2 millimeters.

12. A process according to claim 3 wherein the heat-treating step is carried out employing a maximum temperature of about 300° C. for a maximum period of about 60 minutes.

13. A process according to claim 1 wherein no more than 7 parts of ammonium lignin sulfonate binder are employed.

14. A formed, smokeless fuel prepared by the process of claim 1.

15. A formed, smokeless fuel prepared by the process of claim 3.

References Cited
UNITED STATES PATENTS

| | | | |
|---|---|---|---|
| 2,907,645 | 10/1959 | Hartmann | 44—16 |
| 1,111,800 | 9/1914 | Loesch | 44—17 |
| 3,322,550 | 5/1967 | Murphy | 44—10 RX |
| 3,307,927 | 3/1967 | Müschenborn et al. | 44—19 |

CARL F. DEES, Primary Examiner

U.S. Cl. X.R.

44—16 B, 16 F